(12) United States Patent
Xie

(10) Patent No.: US 10,515,224 B2
(45) Date of Patent: Dec. 24, 2019

(54) METHOD, DEVICE AND STORAGE MEDIUM FOR PRINTING INFORMATION

(71) Applicant: Beijing Xiaomi Mobile Software Co., Ltd., Haidian District, Beijing (CN)

(72) Inventor: Yan Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/132,470

(22) Filed: Sep. 17, 2018

(65) Prior Publication Data

US 2019/0087591 A1  Mar. 21, 2019

(30) Foreign Application Priority Data

Sep. 18, 2017 (CN) .......................... 2017 1 0842649

(51) Int. Cl.
| | | |
|---|---|---|
| *H04N 1/00* | (2006.01) | |
| *G06F 21/60* | (2013.01) | |
| *G06F 3/12* | (2006.01) | |
| *G06F 21/88* | (2013.01) | |
| *H04L 29/06* | (2006.01) | |

(Continued)

(52) U.S. Cl.
CPC .......... *G06F 21/608* (2013.01); *G06F 3/1222* (2013.01); *G06F 3/1238* (2013.01); *G06F 3/1285* (2013.01); *G06F 3/1292* (2013.01); *G06F 21/32* (2013.01); *G06F 21/88* (2013.01); *G06K 9/00087* (2013.01); *G06K 9/00295* (2013.01); *H04L 63/0861* (2013.01); *H04L 63/101* (2013.01)

(58) Field of Classification Search
CPC . H04L 63/0861; H04L 63/101; G06F 21/608; G06F 3/1292; G06F 21/32; G06F 21/88; G06F 3/1222; G06F 3/1238; G06F 3/1285; G06K 9/00295
USPC ....................................................... 358/1.14
See application file for complete search history.

(56) References Cited

U.S. PATENT DOCUMENTS

| | | | |
|---|---|---|---|
| 2009/0253406 A1 | 10/2009 | Fitzgerald | |
| 2018/0032708 A1* | 2/2018 | Mori | ........................ G06F 21/31 |
| 2018/0220042 A1* | 8/2018 | Kosaka | .................. H04N 1/442 |

FOREIGN PATENT DOCUMENTS

EP    3147788 A1    3/2017

OTHER PUBLICATIONS

Extended European search report of European Patent Application No. 18195052.8, from the European Patent office, dated Jan. 14, 2019.

* cited by examiner

*Primary Examiner* — Saeid Ebrahimi Dehkordy
(74) *Attorney, Agent, or Firm* — Jun He Law Offices P.C.; James J. Zhu

(57) ABSTRACT

The present disclosure relates to a method, a device and a storage medium for printing information. The method includes: acquiring authentication information of a current operator of a terminal; determining whether the current operator is a legitimate user according to the authentication information of the current operator; and sending the authentication information to a preset printer associated with the terminal when the current operator is an illegitimate user. In the technical solution, when it is determined that the current operator is an illegitimate user, the authentication information of the current operator is sent to a preset printer, in order for the preset printer to print the authentication information. It can improve the security of the terminal, and thus improve the user experience.

17 Claims, 13 Drawing Sheets

(51) Int. Cl.
*G06F 21/32* (2013.01)
*G06K 9/00* (2006.01)

METHOD, DEVICE AND STORAGE MEDIUM FOR PRINTING INFORMATION

CROSS-REFERENCE TO RELATED APPLICATION

This application is based upon and claims priority to Chinese patent application No. 201710842649.1 filed Sep. 18, 2017, which is incorporated herein by reference in its entirety.

TECHNICAL FIELD

The present disclosure relates to the technical field of communication, and more particularly, to a method, a device and a storage medium for printing information.

BACKGROUND

With the continuous improvement of people's living standards, mobile phones have become essential items in daily lives, and the use frequency thereof has become higher and higher. In the related art, a user can use a mobile phone to perform functions such as shopping, payment, and recording of important information. Therefore, a lot of privacy information of the user is stored in the mobile phone, and if the mobile phone is taken by another person, the privacy information of the user may be leaked.

SUMMARY

In order to overcome the problem in the related art, in embodiments of the present disclosure, a method, a device and a storage medium for printing information are provided. Technical solutions are as follows.

According to a first aspect of the embodiments of the present disclosure, there is provided a method for printing information. The method includes:

acquiring authentication information of a current operator of a terminal;

determining whether the current operator is a legitimate user according to the authentication information of the current operator; and sending the authentication information to a preset printer associated with the terminal when the current operator is an illegitimate user.

According to a second aspect of the embodiments of the present disclosure, there is provided a device for printing information, including:

a first processor; and a first memory for storing instructions executable by the first processor;

wherein the first processor is configured to:

acquire authentication information of a current operator of a terminal;

determine whether the current operator is a legitimate user according to the authentication information of the current operator; and send the authentication information to a preset printer associated with the terminal when the current operator is an illegitimate user.

According to a third aspect of the embodiments of the present disclosure, there is provided a computer readable storage medium having stored thereon computer instructions that, when being executed by a processor, perform the steps of the method according to the first aspect.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 1$b$ is a diagram illustrating an application scenario of a method for printing information according to an exemplary embodiment.

FIG. 1$c$ is a flowchart illustrating a method for printing information according to an exemplary embodiment.

FIG. 1$d$ is a flowchart illustrating a method for printing information according to an exemplary embodiment.

FIG. 1$e$ is a flowchart illustrating a method for printing information according to an exemplary embodiment.

FIG. 2$b$ is a flowchart illustrating a method for printing information according to an exemplary embodiment.

FIG. 2$c$ is a flowchart illustrating a method for printing information according to an exemplary embodiment.

FIG. 6$b$ is a block diagram illustrating a schematic structure of a device for printing information according to an exemplary embodiment.

FIG. 6$c$ is a block diagram illustrating a schematic structure of a device for printing information according to an exemplary embodiment.

FIG. 6$d$ is a block diagram illustrating a schematic structure of a device for printing information according to an exemplary embodiment.

FIG. 6$e$ is a block diagram illustrating a schematic structure of a device for printing information according to an exemplary embodiment.

FIG. 6$f$ is a block diagram illustrating a schematic structure of a device for printing information according to an exemplary embodiment.

FIG. 6$g$ is a block diagram illustrating a schematic structure of a device for printing information according to an exemplary embodiment.

FIG. 7$b$ is a block diagram illustrating a schematic structure of a device for printing information according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1A:
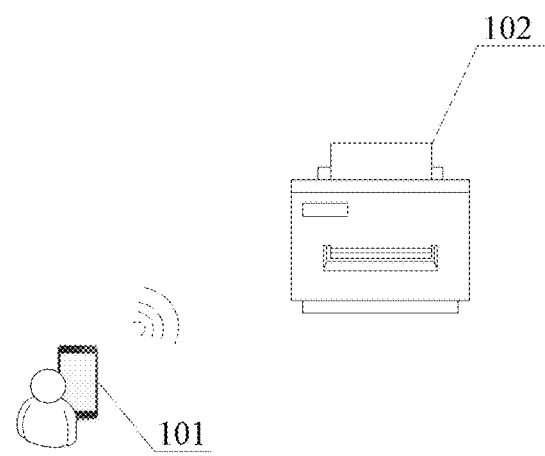
FIG. 1$a$ is a diagram illustrating an application scenario of a method for printing information according to an exemplary embodiment.
Figure 1B:
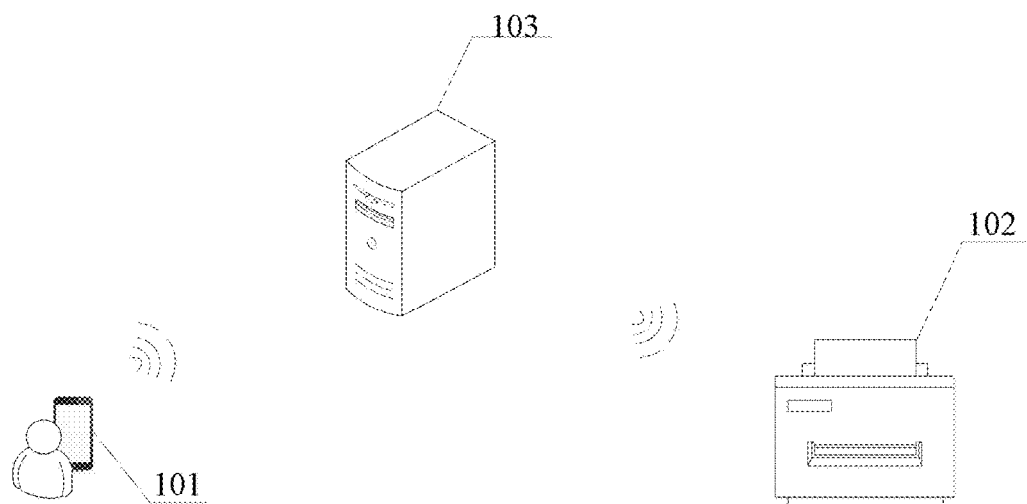

The technical solution provided by the embodiments of the present disclosure relates to a terminal and a printer. The terminal may be a mobile phone, a tablet computer, a smart watch, an intelligent security door, and other smart home appliances, which are not limited in this embodiment of the present disclosure. As shown in FIG. 1a, the terminal 101 may be connected to the printer 102 through a Wi-Fi (Wireless-Fidelity) hotspot, a wireless network signal, Bluetooth, or infrared. Alternatively, as shown in FIG. 1b, the terminal 101 may be connected to a server 103 through a WiFi hotspot or a wireless network signal, and the server 103 is connected to the printer 102 via a Wi-Fi hotspot or a wireless network signal. Taking a mobile phone as an example, the user can set a boot password or a boot fingerprint for the mobile phone. If the mobile phone is stolen, the stealer cannot boot the mobile phone since he cannot know about the boot password and does not have a fingerprint that matches with the boot fingerprint. Thus, it can guarantee the security of the important information in the mobile phone. However, since the user does not know the information of the stealer, it is difficult to find the stolen terminal, such that the security of the information in the terminal cannot be further guaranteed, resulting in the user experience being not high. In the technical solution provided by the embodiment of the present disclosure, when it is determined that the current operator is an illegitimate user, the terminal may send authentication information of the current operator to a preset printer directly, or to a preset printer through a server, in order for the preset printer to print the authentication information. It can improve the security of the terminal, and thus improve the user experience.

In an embodiment of the present disclosure, there is provided a method for printing information. An entity for performing the method is a terminal or a printer. In the embodiment of the present disclosure, depending on different entities for performing the method, there are provided two embodiments of the method.

At Terminal Side

Figure 1C:
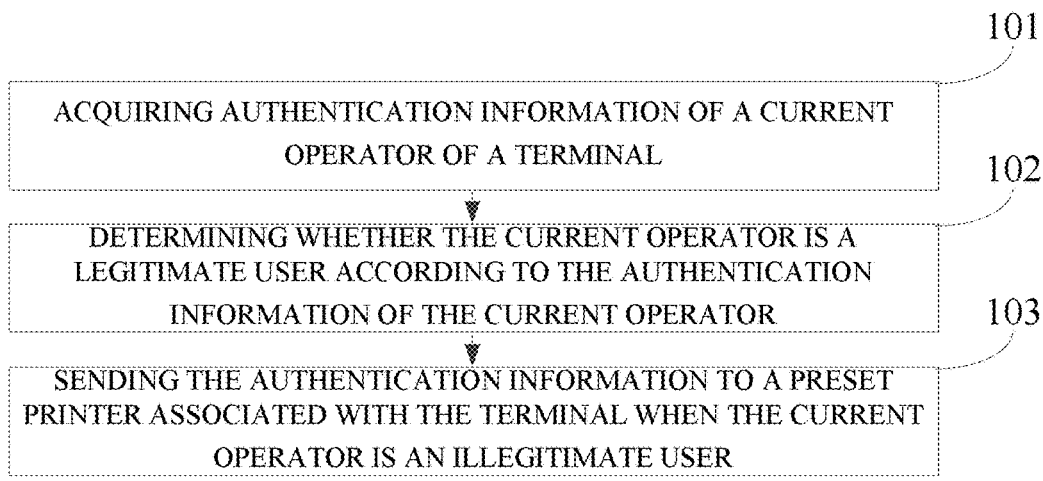

FIG. 1c is a flowchart illustrating a method for printing information according to an exemplary embodiment. The method is applied in a terminal. As shown in FIG. 1c, the method for printing information includes the following steps 101 to 103.

In step 101, authentication information of a current operator of the terminal is acquired.

For example, the authentication information is information for the terminal to determine the identity of the current operator and determine whether or not to become unlocked or operate normally. Taking a mobile phone as an example, the authentication information may be the boot password, boot fingerprint, face information or iris identification, inputted by the current operator. Taking an intelligent security door with a Bluetooth matching function as an example, the authentication information may be Bluetooth matching information of the key carried by the current operator. Taking an intelligent security door with an electronic lock as an example, the authentication information may be a boot password or a boot fingerprint of the current operator.

In step 102, according to the authentication information of the current operator, it is determined whether the current operator is a legitimate user.

In an example, the terminal may confirm whether the authentication information of the current operator matches with preset information. If the authentication information of the current operator matches with the preset information, the terminal may confirm that the current operator is a legitimate user. If the authentication information of the current operator does not match with the preset information, the terminal may confirm that the current operator is an illegitimate user.

Specifically, the terminal may first obtain authentication information of a plurality of legitimate users, and then establish a white list of users according to the reference authentication information of the plurality of legitimate users. After acquiring the authentication information of the current operator, the terminal may determine whether the authentication information of the current operator matches with any of the reference authentication information in the white list of users. If the authentication information of the current operator matches with the reference authentication information, the terminal may confirm that the current operator is a legitimate user. If the authentication information of the current operator does not match with the reference authentication information, the terminal may confirm that the current operator is an illegitimate user.

Taking the authentication information being fingerprint information as an example, the white list of users includes reference fingerprint information of a plurality of legitimate users. After acquiring the fingerprint information of the current operator, the terminal queries the white list of users to determine whether the fingerprint information of the current operator matches with any of the reference fingerprint information in the white list of users, that is, to determine whether similarity between the fingerprint information of the current operator and the reference fingerprint information in the white list of users is greater than or equal to a preset similarity threshold. If the similarity between the fingerprint information of the current operator and the reference fingerprint information in the white list of users is greater than or equal to the preset similarity threshold, it indicates that the authentication information of the current operator matches with the reference authentication information, and the current operator may be confirmed as a legitimate user at this time. If the similarity between the fingerprint information of the current operator and the reference fingerprint information in the white list of users is smaller than the preset similarity threshold, it indicates that the authentication information of the current operator does not match with the reference authentication information, and the current operator may be confirmed as an illegitimate user at this time. By determining whether the current operator is a legitimate user according to the white list of users, the accuracy and convenience of the determination of the legitimate user can be improved, and thus the user experience can be further improved.

In step 103, if the current operator is an illegitimate user, the authentication information is sent to a preset printer associated with the terminal.

For example, the preset printer is a printer that establishes a connection with the terminal. If the current operator is an illegitimate user, the terminal may send the authentication information of the current operator to the preset printer, in order for the preset printer to print it and provide an effective clue for the legitimate user to find the terminal.

In practical applications, both the terminal and the preset printer may be connected to a server. When the terminal determines that the current operator is an illegitimate user, the terminal may send the authentication information of the current operator to the server. After receiving the authentication information, the server queries a preset printer that establishes a connection with the terminal among all the connected printers, and then sends the authentication information to the preset printer, in order for the preset printer to print it and provide an effective clue for the legitimate user to find the terminal.

In the technical solution provided by the embodiment of the present disclosure, when it is determined that the current operator is an illegitimate user, the authentication information of the current operator is sent to the preset printer, in order for the preset printer to print the authentication information. It can improve the security of the terminal, and thus can improve the user experience.

Figure 1D:
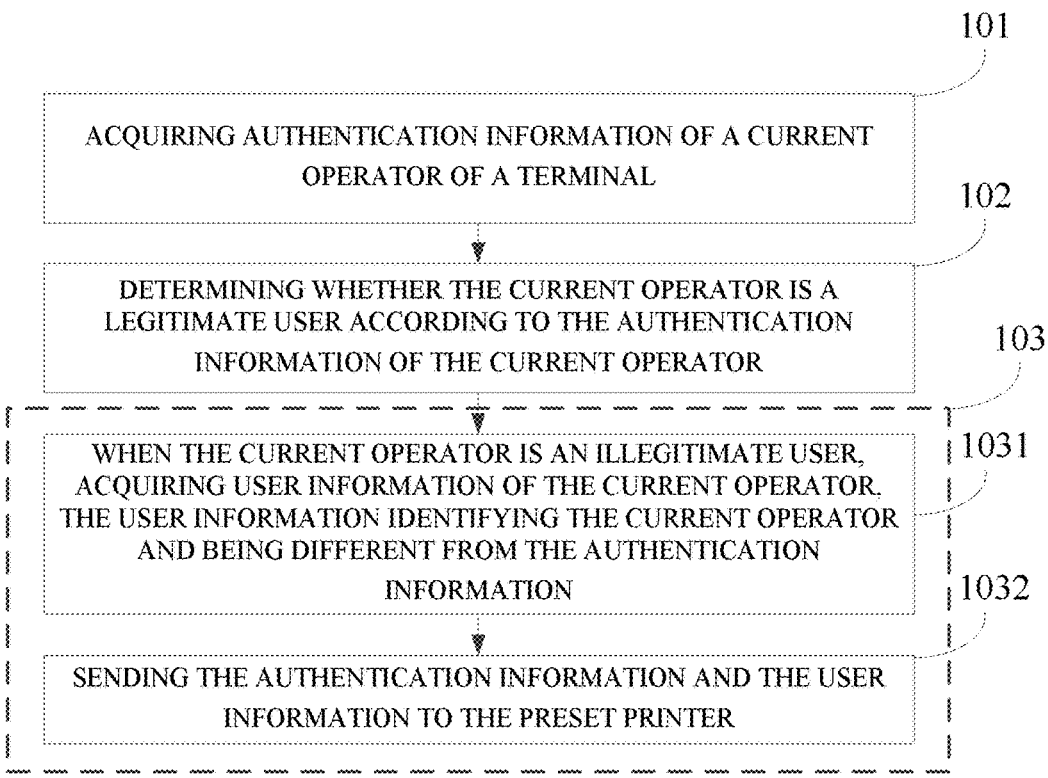

In an embodiment, as shown in FIG. 1*d*, in step 103, if the current operator is an illegitimate user, sending the authentication information to the preset printer may be performed through step 1031 and step 1032.

In step 1031, if the current operator is an illegitimate user, user information of the current operator is acquired. The user information identifies the current operator and is different from the authentication information.

In step 1032, the authentication information and the user information are sent to the preset printer.

For example, when the terminal determines that the current operator is an illegitimate user, the terminal may further acquire the user information of the current operator. The user information may be face information, fingerprint information, iris identification, or the like of the current operator. Both the user information and the authentication information are sent to the preset printer in order for the preset printer to print them.

For example, if the current operator is an illegitimate user, the terminal may start a camera to capture the face information of the current operator, and then send the authentication information and the face information of the current operator to the preset printer.

Alternatively, if the current operator is an illegitimate user, the terminal may start a fingerprint recognition module to collect the fingerprint when the current operator operates the terminal, generate fingerprint information, and send the authentication information and the fingerprint information of the current operator to the preset printer.

In the technical solution provided by the embodiment of the present disclosure, when it is determined that the current operator is an illegitimate user, the user information of the current operator is acquired, and then the authentication information and the user information of the current operator are sent to the preset printer, in order for the preset printer to print the authentication information and the user information. It can improve the security of the terminal, and thus improve the user experience.

Figure 1E:
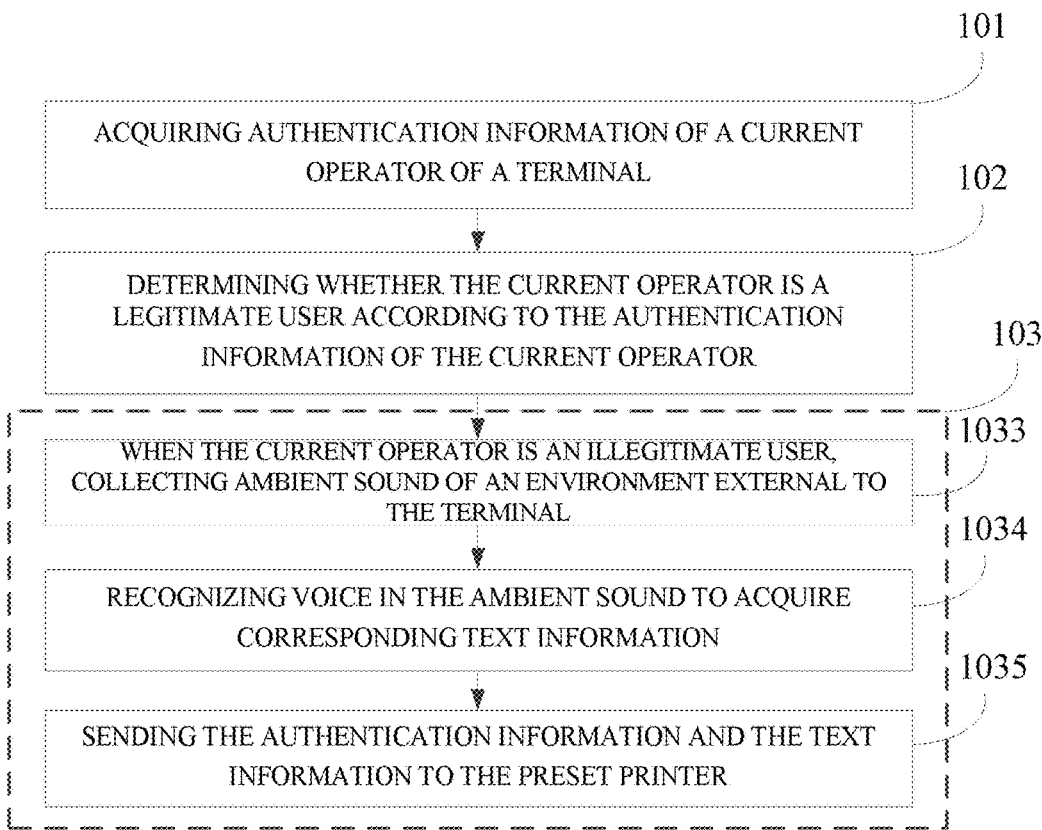

In an embodiment, as shown in FIG. 1*e*, in step 103, if the current operator is an illegitimate user, sending the authentication information to the preset printer may be performed through steps 1033 to 1035.

In step 1033, if the current operator is an illegitimate user, ambient sound of an environment external to the terminal is collected.

In step 1034, voice in the ambient sound is recognized to acquire text information.

In step 1035, the authentication information and the text information are sent to the preset printer.

For example, when the terminal determines that the current operator is an illegitimate user, in order to further recognize the identity of the illegitimate user, the terminal may also collect ambient sound of the environment external to the terminal when the current operator operates the terminal, and then recognize voice in the ambient sound based on voice recognition technology, to obtain text information in the sound of the external environment. Then both the text information and the authentication information of the current operator are sent to the preset printer, so that the legitimate user looking for the terminal may read the text information and determine whether the text information provides an effective clue.

In the technical solution provided by the embodiment of the present disclosure, when it is determined that the current operator is an illegitimate user, the ambient sound of the external environment is acquired, the text information in the ambient sound of the external environment is acquired, and the authentication information of the current operator and the text information are sent to the preset printer, in order for the preset printer to print the authentication information and the text information. It can provide an effective clue for the legitimate user to find the terminal, so the security of the terminal is improved, and thus the user experience is also improved.

At Printer Side

Figure 2A:
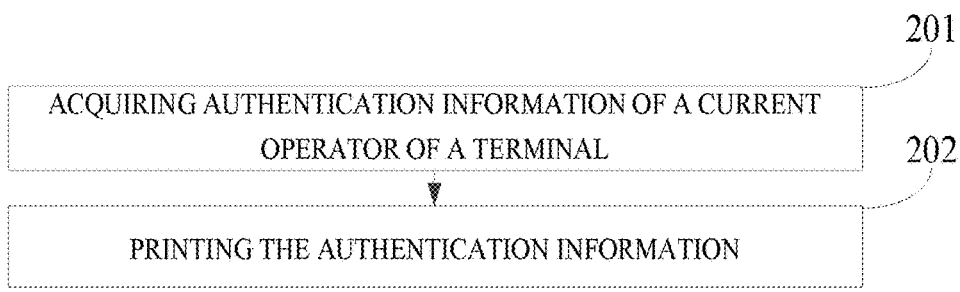
FIG. 2$a$ is a flowchart illustrating a method for printing information according to an exemplary embodiment.

FIG. 2*a* is a flowchart illustrating a method for printing information according to an exemplary embodiment. The method is applied in a printer. As shown in FIG. 2*a*, the method includes the following steps 201 to 202.

In step 201, authentication information of the current operator of the terminal is acquired.

For example, the printer may receive authentication information of the current operator of the terminal sent by the terminal or the server.

For example, the printer may be connected to the terminal through a Wi-Fi hotspot, a wireless network signal, Bluetooth, infrared or the like. When the terminal determines that the current operator is an illegitimate user, the terminal may send the authentication information of the current operator to the printer in order for the printer to receive it.

Alternatively, when the terminal determines that the current operator is an illegitimate user, the terminal may send the authentication information of the current operator to the server in order for the printer to receive it.

In step 202, the authentication information is printed.

For example, after receiving the authentication information of the current operator, the printer may print out the authentication information in a preset way so that the legitimate user may view the authentication information and find the terminal.

In the technical solution provided by the embodiment of the present disclosure, when it is determined that the current operator is an illegitimate user, the printer receives and prints the authentication information of the current operator of the terminal sent by the terminal or the server, and provides an effective clue for the legitimate user to find the terminal. It can improve the security of the terminal, and thus can improve the user experience.

Figure 2B:
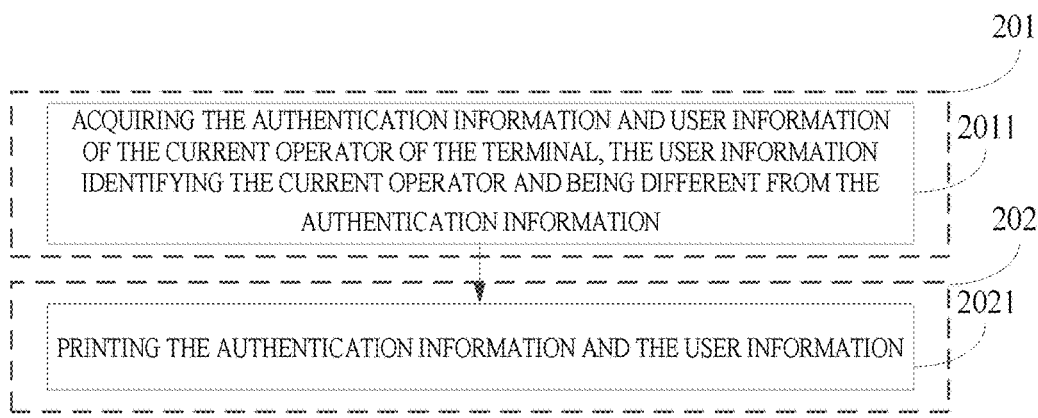

In an embodiment, as shown in FIG. 2b, in step 201, acquiring the authentication information of the current operator of the terminal may be performed through step 2011.

In step 2011, the authentication information and user information of the current operator of the terminal are acquired. The user information identifies the current operator and is different from the authentication information.

In step 202, printing the authentication information may be implemented through step 2021.

In step 2021, the authentication information and the user information are printed.

For example, after confirming that the current operator is an illegitimate user, in order to further recognize the identity of the current operator, the terminal may acquire the user information of the current operator and send the user information together with the authentication information of the current operator to the printer. After receiving the authentication information and the user information, the printer prints the authentication information and the user information, in order for the legitimate user to find the terminal. The user information may be fingerprint information, face information, or iris identification of the current operator.

In the technical solution provided by the embodiment of the present disclosure, when it is determined that the current operator is an illegitimate user, the printer receives and prints the authentication information and the user information of the current operator of the terminal sent by the terminal or the server. It can provide an effective clue for the legitimate user to find the terminal. It can improve the security of the terminal and thus improve the user experience.

Figure 2C:
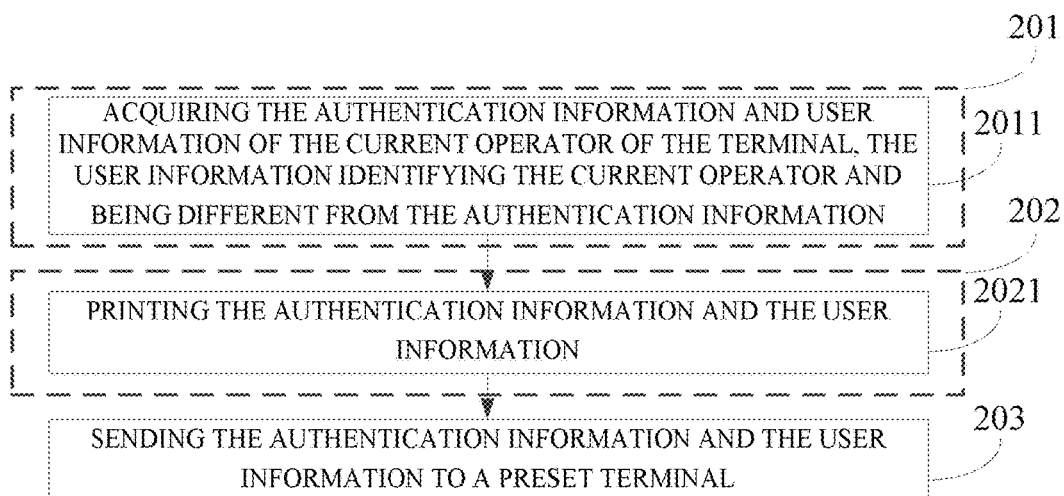

In an embodiment, as shown in FIG. 2c, the method further includes step 203.

In step 203, the authentication information and the user information are sent to a preset terminal.

For example, at the time of initialization, the printer may be provided with one or more preset terminals. The one or more preset terminals may be alarm terminals provided by the police, or may be terminals used by other users who are closely related to the user of the terminal. Receiving the authentication information and the user information sent by the terminal indicates the current operator of the terminal is an illegitimate user. At this time, the printer may send the authentication information and the user information of the current operator to the preset terminal, to promptly raise an alarm, or promptly notify other users about the abnormal use of the terminal In practical applications, after the terminal confirms that the current operator is an illegitimate user, the terminal may also acquire current geographic location information of the terminal. For example, the terminal may capture a map location image of the current location and then send the map location image to the printer. After obtaining the map location image, the printer prints out the map location image to further provide a clue for the legitimate user to find the terminal.

In the technical solution provided by the embodiment of the present disclosure, when it is determined that the current operator is an illegitimate user, the printer sends the received authentication information and user information of the current operator of the terminal to the preset terminal, to promptly raise an alarm to the user of the preset terminal about the abnormal situation of the terminal. It can improve the security of the terminal, and thus improve the user experience.

The implementation process will be described in detail through several embodiments below.

Figure 3:
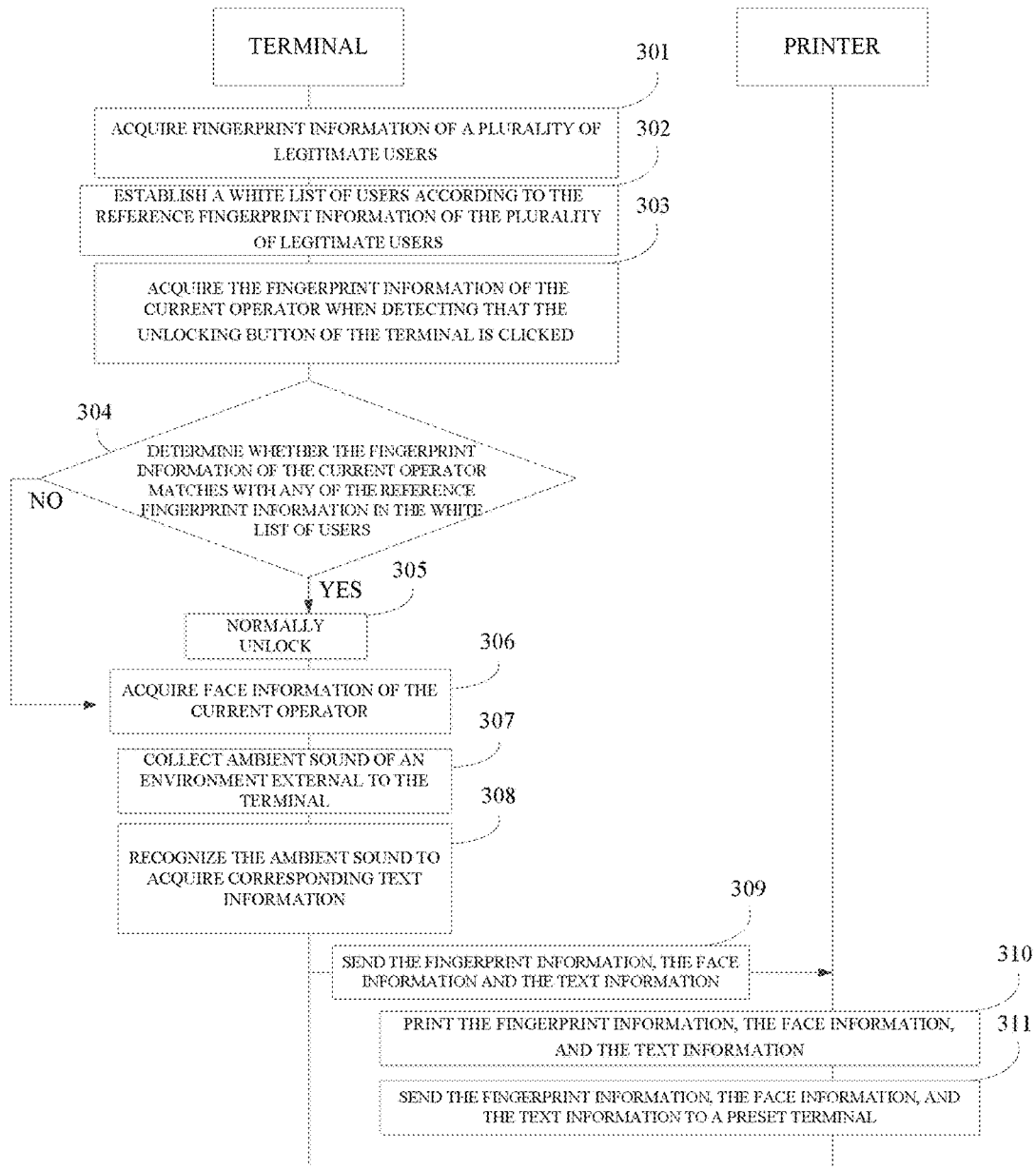
FIG. 3 is a diagram illustrating an interaction of a method for printing information according to an exemplary embodiment.

FIG. 3 is a diagram illustrating an interaction of a method for printing information according to an exemplary embodiment. The entities for performing the method are a terminal and a printer. The printer establishes a connection with the terminal through a Wi-Fi hotspot, a wireless network signal, Bluetooth, infrared or the like. As shown in FIG. 3, the method includes the following steps 301 to 311.

In step 301, the terminal acquires fingerprint information of a plurality of legitimate users, and performs step 302.

In step 302, the terminal establishes a white list of users according to the reference fingerprint information of the plurality of legitimate users, and performs step 303.

In step 303, when detecting that the unlocking button of the terminal is clicked, the terminal acquires the fingerprint information of the current operator, and performs step 304.

In step 304, the terminal determines whether the fingerprint information of the current operator matches with any of reference fingerprint information in the white list of users. If the fingerprint information of the current operator matches with the reference fingerprint information, the terminal proceeds to perform step 305; and if the fingerprint information of the current operator does not match with the reference fingerprint information, the terminal proceeds to perform step 306.

In step 305, the terminal is normally unlocked, and the process ends.

In step 306, the terminal acquires face information of the current operator, and performs step 307.

In step 307, the terminal collects ambient sound of environment external to the terminal, and performs step 308.

In step 308, the terminal recognizes voice in the ambient sound to acquire corresponding text information, and performs step 309.

In step 309, the terminal sends the fingerprint information and the face information of the current operator, as well as the text information to the printer, and performs step 310.

In step 310, the printer prints the fingerprint information, the face information, and the text information, and performs step 311.

In step 311, the printer sends the fingerprint information, the face information, and the text information to a preset terminal.

The embodiment of the present disclosure provides a method for printing information. When it is determined that the current operator is an illegitimate user, the authentication information and the face information of the current operator, as well as the text information are sent to the printer, so that the printer may print out the authentication information. It can provide an effective clue for the legitimate user to find the terminal, improve the security of the terminal, and thus improve the user experience.

Figure 4:
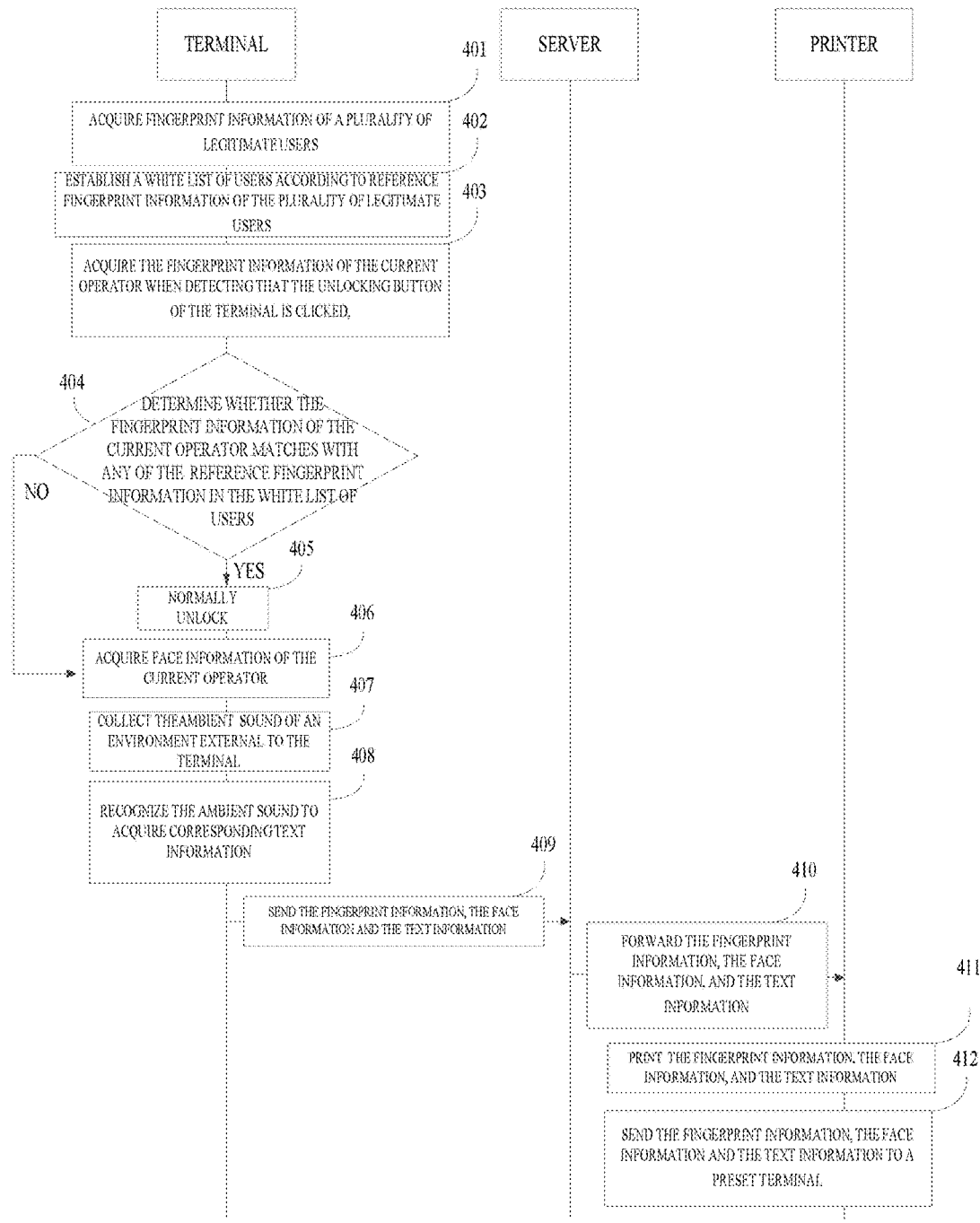
FIG. 4 is a diagram illustrating an interaction of a method for printing information according to an exemplary embodiment.

FIG. 4 is a diagram illustrating an interaction of a method for printing information according to an exemplary embodiment. The entities for performing the method are a terminal, a server, and a printer. The terminal is connected to the server through a Wi-Fi hotspot or a wireless network signal, and the server is connected to the printer through a Wi-Fi hotspot or a wireless network signal. As shown in FIG. 4, the method includes the following steps 401 to 412.

In step 401, the terminal acquires fingerprint information of a plurality of legitimate users, and performs step 402.

In step 402, the terminal establishes a white list of users according to reference fingerprint information of the plurality of legitimate users, and performs step 403.

In step 403, when detecting that the unlocking button of the terminal is clicked, the terminal acquires the fingerprint information of the current operator, and performs step 404.

In step 404, the terminal determines whether the fingerprint information of the current operator matches with any of the reference fingerprint information in the white list of users. If the fingerprint information of the current operator matches with the reference fingerprint information, the terminal proceeds to perform step 405; and if the fingerprint information of the current operator does not match with the reference fingerprint information, the terminal proceeds to perform step 406.

In step 405, the terminal is normally unlocked, and the process ends.

In step 406, the terminal acquires face information of the current operator, and performs step 407.

In step 407, the terminal collects the ambient sound of the environment external to the terminal, and performs step 408.

In step 408, the terminal recognizes voice in the ambient sound to acquire the corresponding text information, and performs step 409.

In step 409, the terminal sends the fingerprint information and the face information of the current operator, as well as the text information to the server, and performs step 410.

In step 410, the server forwards the fingerprint information, the face information, and the text information to the printer, and performs step 411.

In step 411, the printer prints the fingerprint information, the face information, and the text information, and performs step 412.

In step 412, the printer sends the fingerprint information, the face information and the text information to a preset terminal.

The embodiment of the present disclosure provides a method for printing information. When it is determined that the current operator is an illegitimate user, the authentication information and the face information of the current operator, as well as the text information are sent to the printer, so that the printer may print out the authentication information. It can provide an effective clue for the legitimate user to find the terminal, improve the security of the terminal, and thus improve the user experience.

Figure 5:
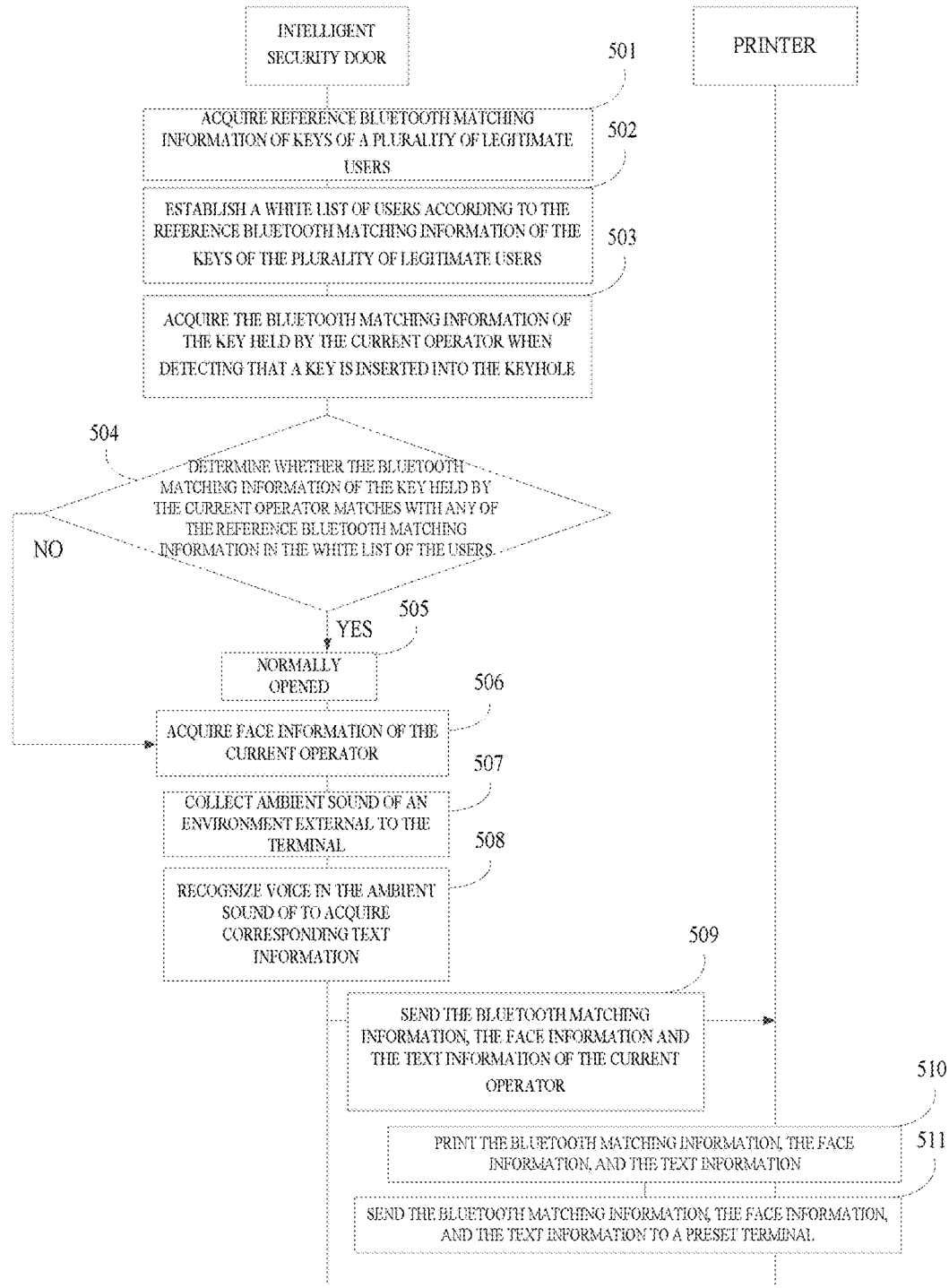
FIG. 5 is a diagram illustrating an interaction of a method for printing information according to an exemplary embodiment.

FIG. 5 is a diagram illustrating an interaction of a method for printing information according to an exemplary embodiment. The entities for performing the method are an intelligent security door and a printer. The intelligent security door establishes a connection with the printer through a Wi-Fi hotspot, a wireless network signal, Bluetooth, infrared or the like. As shown in FIG. 5, the method includes the following steps 501 to 511.

In step 501, the intelligent security door acquires Bluetooth matching information of keys of a plurality of legitimate users, and performs step 502.

In step 502, the intelligent security door establishes a white list of users according to the reference Bluetooth matching information of the keys of the plurality of legitimate users, and performs step 503.

In step 503, when detecting that a key is inserted into the keyhole, the intelligent security door acquires the Bluetooth matching information of the key held by the current operator, and performs step 504.

In step 504, the intelligent security door determines whether the Bluetooth matching information of the key held by the current operator matches with any of the reference Bluetooth matching information in the white list of the users. If the Bluetooth matching information of the key held by the current operator matches with the reference Bluetooth matching information in the white list of users, the intelligent security door proceeds to perform step 505; and if the Bluetooth matching information of the key held by the current operator does not match with the reference Bluetooth matching information in the white list of users, the intelligent security door proceeds to perform step 506.

In step 505, the intelligent security door is normally opened and the process ends.

In step 506, the intelligent security door acquires face information of the current operator, and performs step 507.

In step 507, the intelligent security door collects ambient sound of an environment external to the terminal, and performs step 508.

In step 508, the intelligent security door recognizes voice in the ambient sound to acquire the text information in the sound of the external environment, and performs step 509.

In step 509, the intelligent security door sends the Bluetooth matching information and the face information of the current operator, as well as the text information to the printer, and performs step 510.

In step 510, the printer prints the Bluetooth matching information, the face information, and the text information, and performs step 511.

In step 511, the printer sends the Bluetooth matching information, the face information, and the text information to a preset terminal.

The embodiment of the present disclosure provides a method for printing information. When it is determined that the current operator is an illegitimate user, the authentication information and the face information of the current operator, as well as the corresponding text information are sent to the printer, so that the printer may print out the authentication information. It can provide an effective clue for the legitimate user to find the terminal, improve the security of the terminal, and thus improve the user experience.

The following is device embodiments of the present disclosure and may be used to perform the method embodiments of the present disclosure.

Figure 6A:
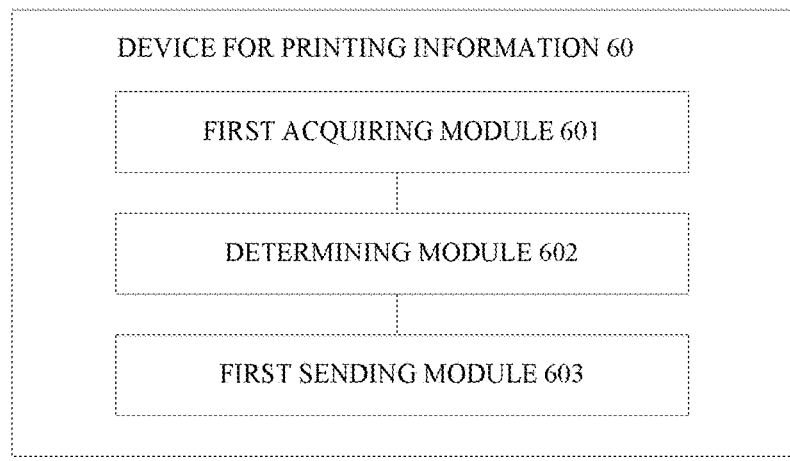
FIG. 6$a$ is a block diagram illustrating a schematic structure of a device for printing information according to an exemplary embodiment.

FIG. 6a is a block diagram illustrating a schematic structure of a device 60 for printing information according to an exemplary embodiment. The device 60 may be implemented as a part or all of an electronic device through software, hardware, or a combination of both. As shown in FIG. 6a, the device 60 for printing information includes: a first acquiring module 601, a determining module 602 and a first sending module 603.

The first acquiring module 601 is configured to acquire authentication information of a current operator of a terminal.

The determining module 602 is configured to determine whether the current operator is a legitimate user according to the authentication information of the current operator.

The first sending module 603 is configured to send the authentication information to a preset printer associated with the terminal when the current operator is an illegitimate user.

Figure 6B:
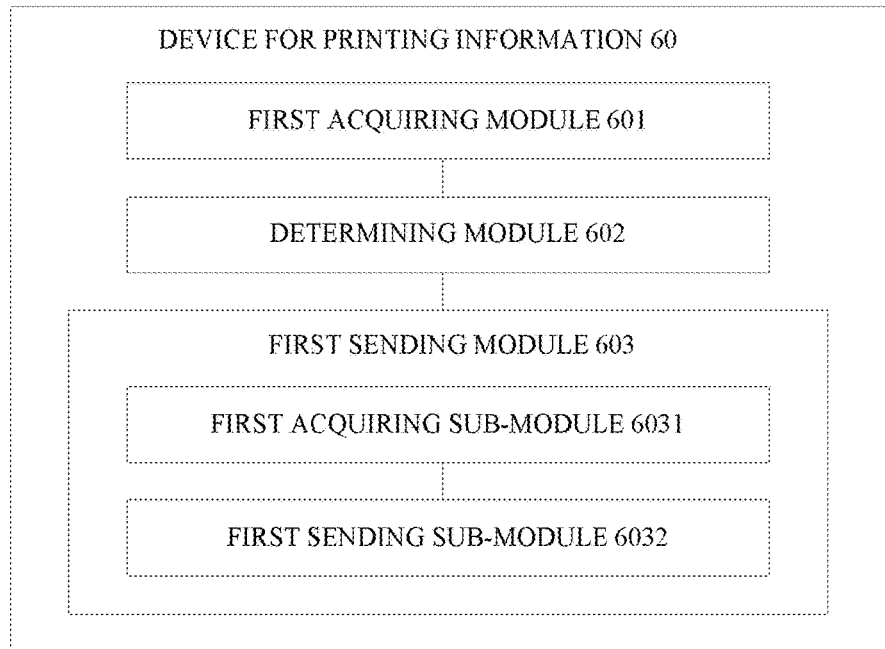

In an embodiment, as shown in FIG. 6b, the first sending module 603 includes: a first acquiring sub-module 6031 and a first sending sub-module 6032.

The first acquiring sub-module 6031 is configured to, when the current operator is an illegitimate user, acquire user information of the current operator, the user information identifying the current operator and being different from the authentication information.

The first sending sub-module 6032 is configured to send the authentication information and the user information to the preset printer.

Figure 6C:
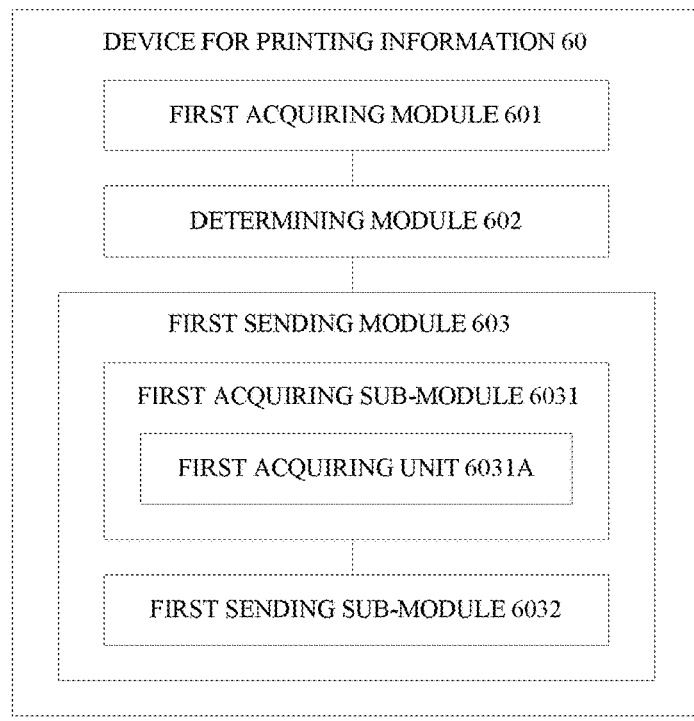

In an embodiment, as shown in FIG. 6*c*, the first acquiring sub-module 6031 includes a first acquiring unit 6031*a*. The first acquiring unit 6031*a* is configured to, when the current operator is an illegitimate user, acquire face information of the current operator.

Figure 6D:
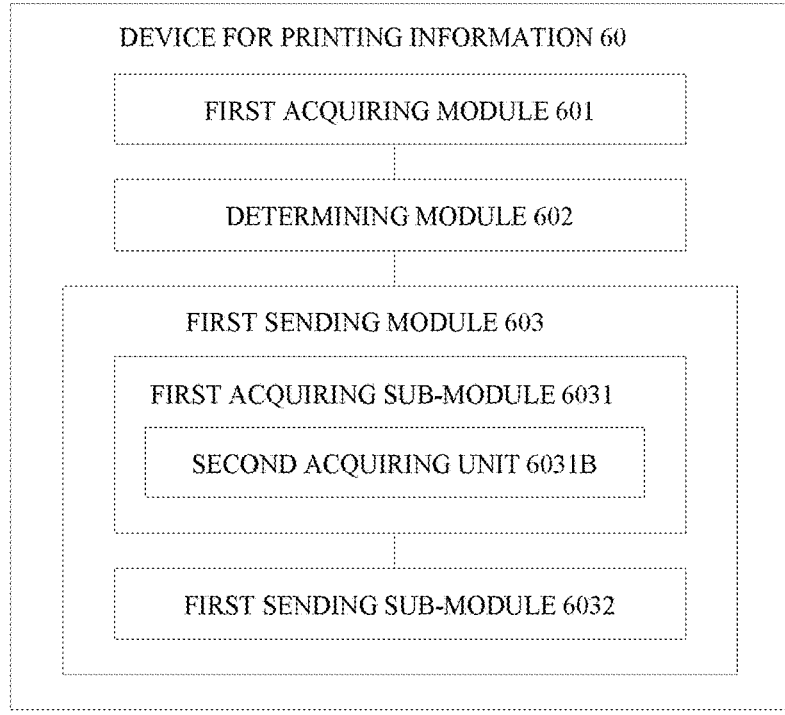

In an embodiment, as shown in FIG. 6*d*, the first acquiring sub-module 6031 includes a second acquiring unit 6031*b*. The second acquiring unit 6031*b* is configured to, when the current operator is an illegitimate user, acquire fingerprint information of the current operator.

Figure 6E:
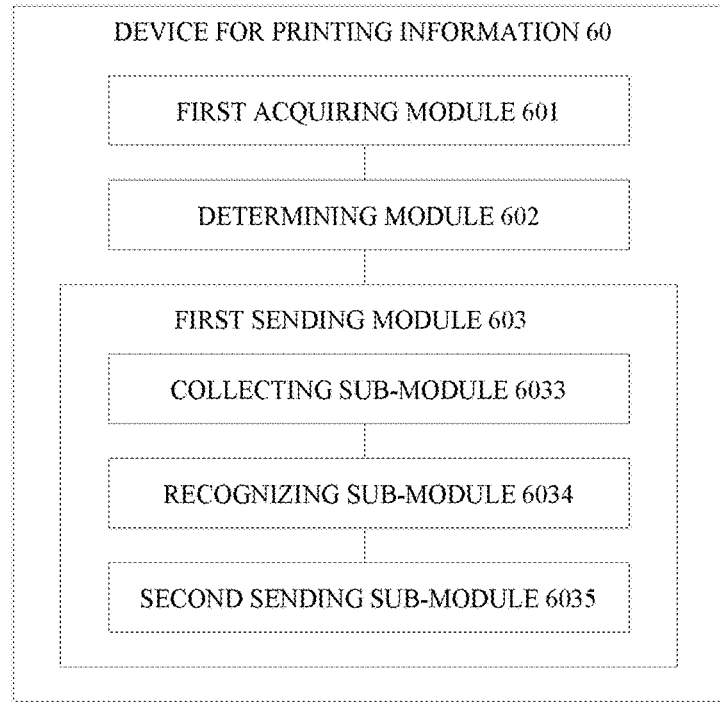

In an embodiment, as shown in FIG. 6*e*, the first sending module 603 includes: a collecting sub-module 6033, a recognizing sub-module 6034 and a second sending sub-module 6035.

The collecting sub-module 6033 is configured to, when the current operator is an illegitimate user, collect ambient sound of an environment external to the terminal.

The recognizing sub-module 6034 is configured to recognize voice in the ambient sound, to acquire corresponding text information.

The second sending sub-module 6035 is configured to send the authentication information and the text information to the preset printer.

Figure 6F:
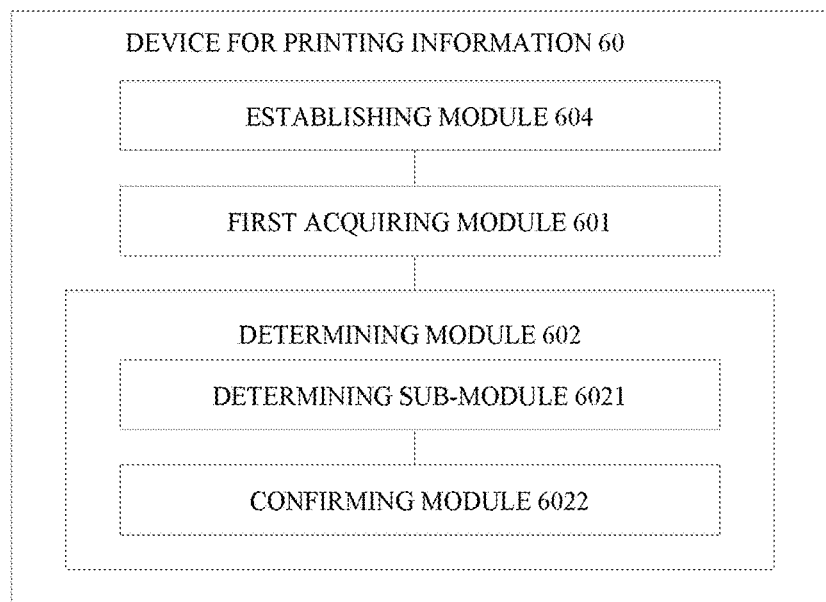

In an embodiment, as shown in FIG. 6*f*, the device 60 further includes: an establishing module 604. The establishing module 604 is configured to establish a white list of users, the white list of users including reference authentication information of a plurality of legitimate users. The determining module 602 includes: a determining sub-module 6021 and a confirming module 6022. The determining sub-module 6021 is configured to determine whether the authentication information of the current operator matches with any of the reference authentication information in the white list of users. The confirming module 6022 is configured to, when the authentication information of the current operator matches with the reference authentication information, confirm that the current operator is a legitimate user; and when the authentication information of the current operator does not match with the reference authentication information, confirm that the current operator is an illegitimate user.

Figure 6G:
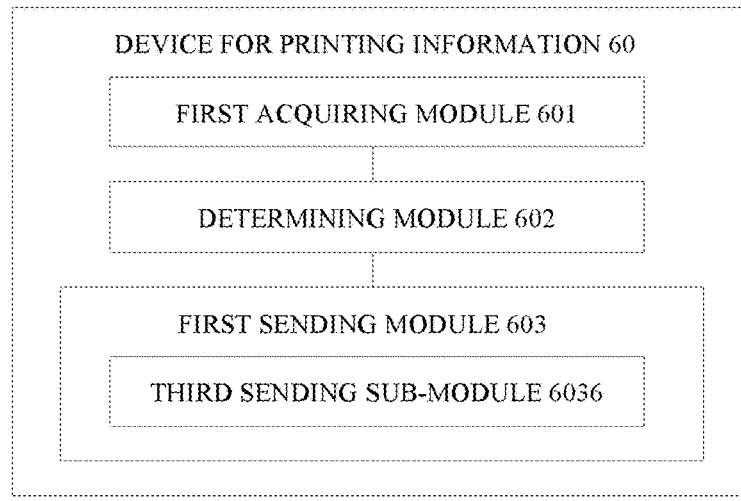

In an embodiment, as show in FIG. 6*g*, the first sending module 603 includes a third sending sub-module 6036. The third sending sub-module 6036 is configured to, when the current operator is an illegitimate user, send the authentication information to a server which is in communication with the terminal and the preset printer and configured to forward the authentication information to the preset printer.

The embodiment of the present disclosure provides a device for printing information. When it is determined that the current operator is an illegitimate user, the device may send the authentication information and the user information of the current operator, and/or the text information corresponding to the ambient sound to the printer, in order for the preset printer to print out the authentication information and provide an effective clue for the legitimate user to find the terminal. It can improve the security of the terminal, and thus improve the user experience.

Figure 7A:
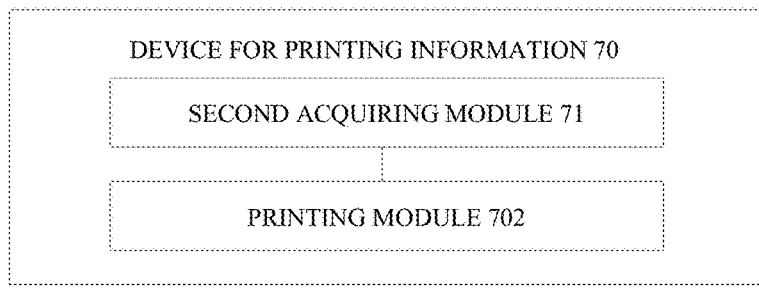
FIG. 7$a$ is a block diagram illustrating a schematic structure of a device for printing information according to an exemplary embodiment.
FIG. 7c is a block diagram illustrating a schematic structure of a device for printing information according to an exemplary embodiment.

FIG. 7*a* is a block diagram illustrating a schematic structure of a device 70 for printing information according to an exemplary embodiment. The device 70 may be implemented as a part or all of an electronic device through software, hardware, or a combination of both. As shown in FIG. 7*a*, the device 70 for printing information includes: a second acquiring module 701 and a printing module 702.

The second acquiring module 701 is configured to acquire authentication information of a current operator of a terminal.

The printing module 702 is configured to print the authentication information.

Figure 7B:
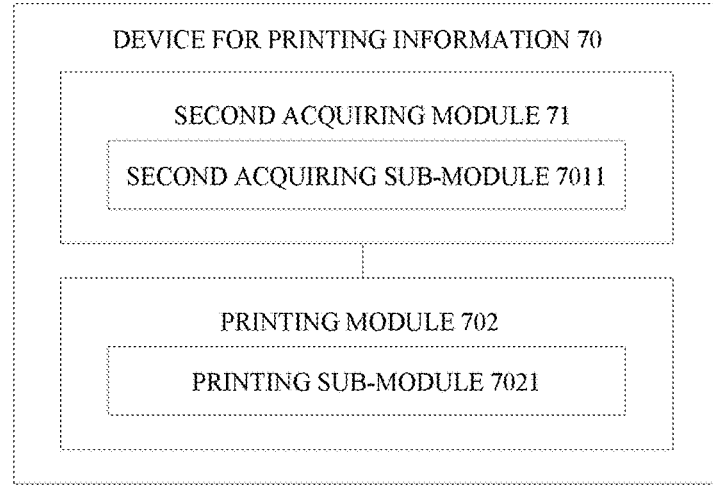

In an embodiment, as shown in FIG. 7*b*, the second acquiring module 701 includes a second acquiring sub-module 7011, and the printing module 702 includes a printing sub-module 7021.

The second acquiring sub-module 7011 is configured to acquire the authentication information and user information of the current operator of the terminal, the user information identifying the current operator and being different from the authentication information.

The printing sub-module 7021 is configured to print the authentication information and the user information.

Figure 7C:
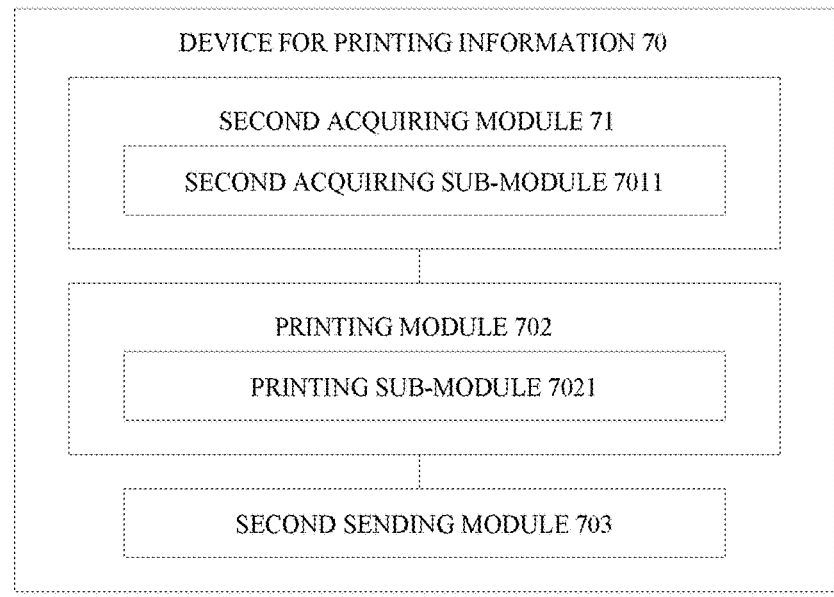

In an embodiment, as show in FIG. 7*c*, the device 70 further includes a second sending module 703.

The second sending module 703 is configured to send the authentication information and the user information to a preset terminal.

The embodiment of the present disclosure provides a device for printing information. When it is determined that the current operator is an illegitimate user, the device may receive from the terminal or the server and print authentication information and user information of the current operator of the terminal, and/or text information corresponding to the sound of the external environment, to provide an effective clue for the legitimate user to find the terminal. It can improve the security of the terminal, and thus improve the user experience.

An embodiment of the present disclosure provides a device for printing information, including:

a first processor; and a first memory for storing instructions executable by the first processor;

wherein the first processor is configured to:

acquire authentication information of a current operator of a terminal;

determine whether the current operator is a legitimate user according to the authentication information of the current operator; and send the authentication information to a preset printer when the current operator is an illegitimate user.

In an embodiment, the above first processor may be further configured to, when the current operator is an illegitimate user, acquire user information of the current operator, the user information identifying the current operator and being different from the authentication information; and send the authentication information and the user information to the preset printer.

In an embodiment, the user information includes at least one of face information and fingerprint information of the user.

In an embodiment, the above first processor may be further configured to, when the current operator is an illegitimate user, collect ambient sound of an environment external to the terminal; recognize the ambient sound, to acquire corresponding text information; and send the authentication information and the text information to the preset printer.

In an embodiment, the above first processor may be further configured to establish a white list of users, the white list of users including reference authentication information of a plurality of legitimate users; determine whether the authentication information of the current operator matches with any of the reference authentication information in the white list of users; when the authentication information of the current operator matches with the reference authentication information, confirm that the current operator is a legitimate user; and when the authentication information of the current operator does not match with the reference authentication information, confirm that the current operator is an illegitimate user.

In an embodiment, the above first processor may be further configured to, when the current operator is an illegitimate user, send the authentication information to a server which is in communication with the terminal and the preset printer and is configured to forward the authentication information to the preset printer.

The embodiment of the present disclosure provides a device for printing information. When it is determined that the current operator is an illegitimate user, the device may send the authentication information and the user information of the current operator, and/or the text information corresponding to the ambient sound, in order for the preset printer to print the authentication information, thereby providing an effective clue for the legitimate user to find the terminal. It can improve the security of the terminal, and thus improve the user experience.

An embodiment of the present disclosure provides a device for printing information, including:
 a second processor; and
 a second memory for storing instructions executable by the second processor;
 wherein the second processor is configured to:
 acquire authentication information of a current operator of a terminal; and
 print the authentication information.

In an embodiment, the above second processor may be further configured to, acquire the authentication information and user information of the current operator of the terminal, the user information identifying the current operator and being different from the authentication information; and print the authentication information and the user information.

In an embodiment, the above second processor may be further configured to send the authentication information and the user information to a preset terminal.

The embodiment of the present disclosure provides a device for printing information. When it is determined that the current operator is an illegitimate user, the device may receive and print authentication information and user information of the current operator of the terminal, and/or text information corresponding to the ambient sound from the terminal or the server, to provide an effective clue for the legitimate user to find the terminal. It can improve the security of the terminal, and thus improve the user experience.

With respect to the device in the above embodiments, the specific manners for performing operations for individual modules therein have been described in detail in the embodiments regarding the relevant methods, which will not be elaborated herein.

Figure 8:
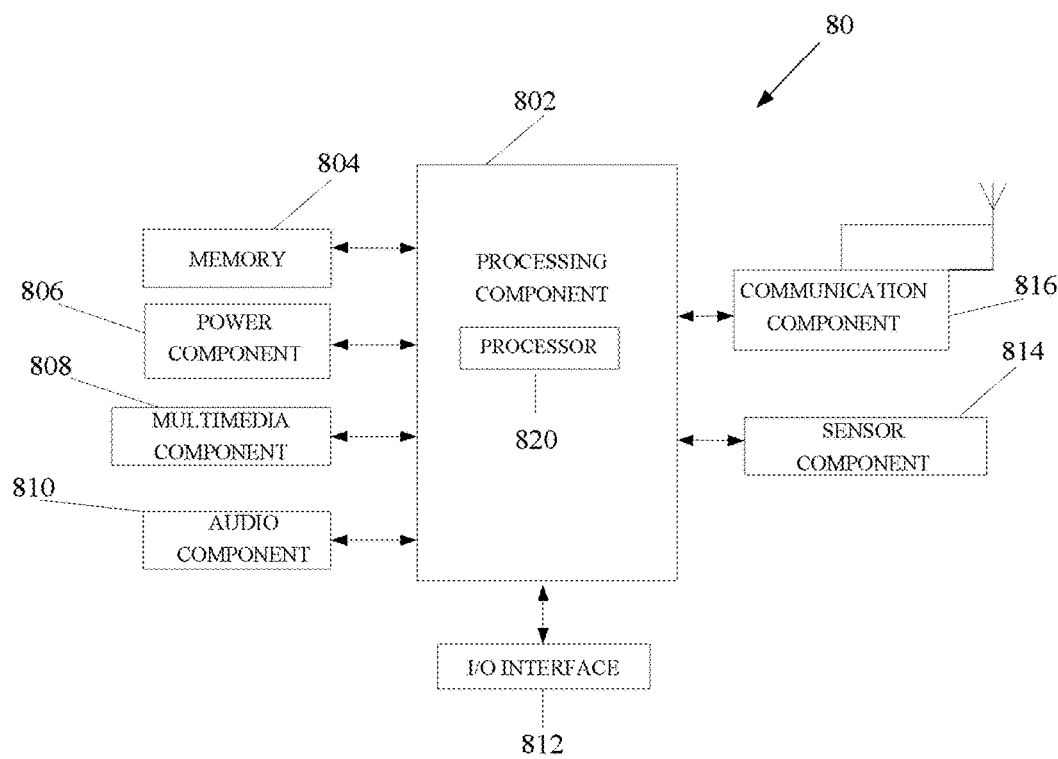
FIG. 8 is a block diagram illustrating a structure of a device for printing information according to an exemplary embodiment.

FIG. 8 is a block diagram illustrating a device 80 for printing information according to an exemplary embodiment. The device 80 is applied in a terminal device. For example, the device 80 may be a mobile phone, a computer, a digital broadcast terminal, a messaging device, a gaming console, a tablet, a medical device, exercise equipment, a personal digital assistant, and the like.

The device 80 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 80, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 80. Examples of such data include instructions for any applications or methods operated on the device 80, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 80. The power component 806 may include a power management system, one or more power sources, and any other components associated with the generation, management, and distribution of power in the device 80.

The multimedia component 808 includes a screen providing an output interface between the device 80 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the device 80 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 80 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 80. For instance, the sensor component 814 may detect an open/closed status of the device 80, relative positioning of components, e.g., the display and the keypad, of the device 80, a change in position of the device 80 or a component of the device 80, a presence or absence of user contact with the device 80, an orientation or an acceleration/deceleration of the device 80, and a change in temperature of the device 80. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 80 and other devices. The device 80 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 80 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method for printing information at the terminal.

In exemplary embodiments, there is also provided a non-transitory computer-readable storage medium including instructions, such as included in the memory 804, executable by the processor 820 in the device 80, for performing the any of the method for printing information at the terminal. For example, the non-transitory computer-readable storage medium may be a ROM, a RAM, a CD-ROM, a magnetic tape, a floppy disc, an optical data storage device, and the like.

Figure 9:
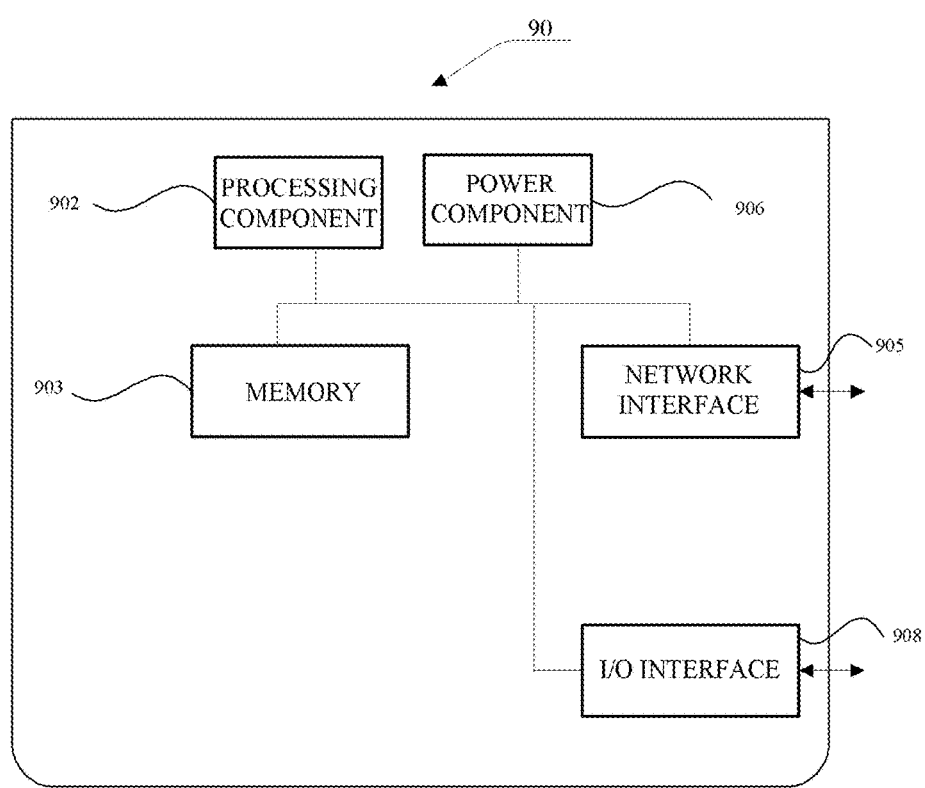
FIG. 9 is a block diagram illustrating a structure of a device for printing information according to an exemplary embodiment.

FIG. 9 is a block diagram of a device 90 for printing information according to an exemplary embodiment. The device 90 includes a processing component 902 that further includes one or more processors, and memory resources represented by a memory 903 for storing instructions executable by the processing component 902, such as application programs. The application programs stored in the memory 903 may include one or more modules each corresponding to a set of instructions. Further, the processing component 902 is configured to execute the instructions to perform the above described method for printing information at the printer.

The device 90 may also include a power component 906 configured to perform power management of the device 90, wired or wireless network interface(s) 905 configured to connect the device 90 to a network, and an input/output (I/O) interface 908. The device 90 may operate based on an operating system stored in the memory 903, such as Windows Server™, Mac OS X™, Unix™, Linux™, FreeBSD™, or the like.

An embodiment of the present disclosure provides a non-transitory computer readable storage medium, and when instructions in the storage medium are executed by the processor of the device 80, the device 80 is caused to perform the method for printing information. The method includes:

acquiring authentication information of a current operator of a terminal;

determining whether the current operator is a legitimate user according to the authentication information of the current operator; and sending the authentication information to a preset printer associated with the terminal when the current operator is an illegitimate user.

In an embodiment, sending the authentication information to a preset printer associated with the terminal when the current operator is an illegitimate user includes: when the current operator is an illegitimate user, acquiring user information of the current operator, wherein the user information identifies the current operator and is different from the authentication information; and sending the authentication information and the user information to the preset printer.

In an embodiment, the user information includes at least one of face information and fingerprint information of the user.

In an embodiment, sending the authentication information to a preset printer when the current operator is an illegitimate user includes: when the current operator is an illegitimate user, collecting ambient sound of an environment external to the terminal; recognizing the ambient sound to acquire corresponding text information; and sending the authentication information and the text information to the preset printer.

In an embodiment, the method further includes: establishing a white list of users, the white list of users including reference authentication information of a plurality of legitimate users; wherein determining whether the current operator is a legitimate user according to the reference authentication information of the current operator includes: determining whether the authentication information of the current operator matches with any of the reference authentication information in the white list of users; when the authentication information of the current operator matches with the reference authentication information, confirming that the current operator is a legitimate user; and when the authentication information of the current operator does not match with the reference authentication information, confirming that the current operator is an illegitimate user.

In an embodiment, sending the authentication information to a preset printer associated with the terminal when the current operator is an illegitimate user includes: when the current operator is an illegitimate user, sending the authentication information to a server which is in communication with the terminal and the preset printer and configured to forward the authentication information to the preset printer when the current operator is an illegitimate user.

In an embodiment, the method further includes: sending the authentication information to another terminal associated with the terminal when the current operator is an illegitimate user.

An embodiment of the present disclosure further provides a non-transitory computer readable storage medium, and when instructions in the storage medium are executed by the processor of the device 90, the device 90 is caused to perform the method for printing information. The method includes:

acquiring authentication information of a current operator of a terminal; and printing the authentication information.

In an embodiment, acquiring authentication information of a current operator of a terminal includes: acquiring the authentication information and user information of the current operator of the terminal, the user information identifying the current operator and being different from the authentication information; and printing the authentication information includes: printing the authentication information and the user information.

In an embodiment, the method further includes: sending the authentication information and the user information to a preset terminal.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for printing information, comprising:
   acquiring authentication information of a current operator of a terminal;
   determining whether the current operator is a legitimate user according to the authentication information of the current operator;
   acquiring user information of the current operator when the current operator is an illegitimate user, wherein the user information identifies the current operator and is different from the authentication information; and
   sending the authentication information and the user information to the preset printer.

2. The method according to claim 1, wherein the user information comprises at least one of face information and fingerprint information of the user.

3. The method according to claim 1, wherein sending the authentication information to a preset printer associated with the terminal when the current operator is an illegitimate user comprises:
   collecting ambient sound of an environment external to the terminal when the current operator is an illegitimate user;
   recognizing voice in the ambient sound to acquire corresponding text information; and
   sending the authentication information and the text information to the preset printer.

4. A non-transitory computer readable storage medium thereon computer instructions that, when being executed by a processor, perform the steps of the method of claim 1.

5. The method according to claim 1, further comprising:
   establishing a white list of users, wherein the white list of users comprises reference authentication information of a plurality of legitimate users; and
   wherein determining whether the current operator is a legitimate user according to the authentication information of the current operator comprises:
   determining whether the authentication information of the current operator matches with any of the reference authentication information in the white list of users;
   determining that the current operator is a legitimate user when the authentication information of the current operator matches with the reference authentication information; and
   determining that the current operator is an illegitimate user when the authentication information of the current operator does not match with the reference authentication information.

6. The non-transitory computer readable storage medium according to claim 4, wherein when being executed by a processor, the computer instructions perform the steps of the method of claim 5.

7. The method according to claim 1, wherein sending the authentication information to a preset printer associated with the terminal when the current operator is an illegitimate user comprises:
   sending the authentication information to a server which is in communication with the terminal and the preset printer and configured to forward the authentication information to the preset printer when the current operator is an illegitimate user.

8. The non-transitory computer readable storage medium according to claim 4, wherein when being executed by a processor, the computer instructions perform the steps of the method of claim 7.

9. The method according to claim 1, further comprising:
   sending the authentication information to another terminal associated with the terminal when the current operator is an illegitimate user.

10. The non-transitory computer readable storage medium according to claim 4, wherein when being executed by a processor, the computer instructions perform the steps of the method of claim 3.

11. The non-transitory computer readable storage medium according to claim 4, wherein the user information comprises at least one of face information and fingerprint information of the user.

12. A device for printing information, comprising:
   a first processor; and
   a first non-transitory computer readable storage medium for storing instructions executable by the first processor;
   wherein the first processor is configured to:
   acquire authentication information of a current operator of a terminal;
   determine whether the current operator is a legitimate user according to the authentication information of the current operator;

acquire user information of the current operator when the current operator is an illegitimate user, wherein the user information identifies the current operator and is different from the authentication information; and send the authentication information and the user information to the preset printer.

13. The device according to claim 12, wherein the user information comprises at least one of face information and fingerprint information of the user.

14. The device according to claim 12, wherein the first processor is further configured such that sending the authentication information to a preset printer associated with the terminal when the current operator is an illegitimate user comprises:

collecting ambient sound of an environment external to the terminal when the current operator is an illegitimate user;

recognizing voice in the ambient sound to acquire corresponding text information; and sending the authentication information and the text information to the preset printer.

15. The device according to claim 12, wherein the first processor is further configured to:

establish a white list of users, wherein the white list of users comprises reference authentication information of a plurality of legitimate users; and wherein determining whether the current operator is a legitimate user according to the authentication information of the current operator comprises:

determining whether the authentication information of the current operator matches with any of the reference authentication information in the white list of users;

determining that the current operator is a legitimate user when the authentication information of the current operator matches with the reference authentication information; and determining that the current operator is an illegitimate user when the authentication information of the current operator does not match with the reference authentication information.

16. The device according to claim 12, wherein the first processor is further configured such that sending the authentication information to a preset printer associated with the terminal when the current operator is an illegitimate user comprises:

sending the authentication information to a server which is in communication with the terminal and the preset printer and configured to forward the authentication information to the preset printer when the current operator is an illegitimate user.

17. The device according to claim 12, wherein the first processor is further configured to send the authentication information to another terminal associated with the terminal when the current operator is an illegitimate user.

* * * * *